US010051005B2

United States Patent
Fry et al.

(10) Patent No.: US 10,051,005 B2
(45) Date of Patent: Aug. 14, 2018

(54) SYSTEMS AND METHODS FOR UTILIZING UNI-DIRECTIONAL INTER-HOST COMMUNICATION IN AN AIR GAP ENVIRONMENT

(71) Applicant: salesforce.com, inc., San Francisco, CA (US)

(72) Inventors: Benjamin Fry, San Francisco, CA (US); Timothy Kral, San Francisco, CA (US); Simon Chen, San Francisco, CA (US); Andrey Falko, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/087,607

(22) Filed: Mar. 31, 2016

(65) Prior Publication Data

US 2016/0285917 A1    Sep. 29, 2016

Related U.S. Application Data

(62) Division of application No. 14/225,164, filed on Mar. 25, 2014, now Pat. No. 9,306,906.

(Continued)

(51) Int. Cl.
*H04L 29/06* (2006.01)

(52) U.S. Cl.
CPC .......... *H04L 63/20* (2013.01); *H04L 63/0209* (2013.01); *H04L 63/0227* (2013.01); *H04L 63/0272* (2013.01); *H04L 63/105* (2013.01)

(58) Field of Classification Search
None
See application file for complete search history.

(56) References Cited

U.S. PATENT DOCUMENTS 5,577,188 A    11/1996   Zhu
5,608,872 A    3/1997   Schwartz et al.
(Continued)

OTHER PUBLICATIONS

Restriction Requirement for U.S. Appl. No. 14/225,164 dated Aug. 24, 2015, 5 pages.
(Continued)

*Primary Examiner* — Jason K Gee
(74) *Attorney, Agent, or Firm* — Jaffery, Watson, Mendonsa & Hamilton, LLC

(57) ABSTRACT

A request message is generated with a trusted network entity executing trusted code on a first network layer. The request message to target a non-trusted network entity executing non-trusted code on a second network layer. The request message is transmitted from the trusted network entity to the non-trusted network entity through at least a policy enforcement entity. The policy enforcement entity applies one or more network traffic rules to enforce a unidirectional flow of traffic from the first network layer to the second network layer. A response check message is generated with the trusted network entity. The response check message to determine whether response information is available on the non-trusted network entity in response to the request message. The response check message is transmitted from the trusted network entity to the non-trusted network entity through at least the policy enforcement entity. The response check message to determine whether the response information is stored in a conceptual mailbox on the non-trusted network entity.

21 Claims, 5 Drawing Sheets

Related U.S. Application Data

(60) Provisional application No. 61/804,904, filed on Mar. 25, 2013.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0053032 A1* | 5/2002 | Dowling ............ H04L 29/0602 726/15 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0102503 A1* | 5/2005 | Imai ................ G06F 21/445 713/156 |
| 2006/0174337 A1* | 8/2006 | Bernoth ............ H04L 63/0263 726/11 |
| 2008/0092007 A1 | 4/2008 | Takach et al. |
| 2008/0295131 A1* | 11/2008 | Grover ............ H04N 7/17318 725/39 |
| 2010/0318785 A1* | 12/2010 | Ozgit ................ H04L 63/1425 713/154 |
| 2013/0010954 A1 | 1/2013 | Falk et al. |

OTHER PUBLICATIONS

Virtual Air Gap (VAG) v1.0.6., Security Target Lite Version 1.10 http://www.commoncriteriaportal.org/files/epfiles/2011-06-DS-lite.pdf—Aug. 2012, 62 pages.

Notice of Allowance for U.S. Appl. No. 14/225,164 dated Nov. 25, 2015, 11 pages.

Non-Final Office Action for U.S. Appl. No. 15/087,599 dated Mar. 8, 2017, 13 pages.

Final Office Action for U.S. Appl. No. 15/087,599 dated Jun. 22, 2017, 13 pages.

Non-Final Office Action for U.S. Appl. No. 15/087,599 dated Nov. 8, 2017, 13 pages.

\* cited by examiner

SYSTEMS AND METHODS FOR UTILIZING UNI-DIRECTIONAL INTER-HOST COMMUNICATION IN AN AIR GAP ENVIRONMENT

CROSS REFERENCE TO RELATED APPLICATIONS

This United States divisional patent application is related to, and claims priority to U.S. patent application Ser. No. 14/225,164 filed Mar. 25, 2014, entitled "SYSTEMS AND METHODS FOR UTILIZING UNI-DIRECTIONAL INTER-HOST COMMUNICATION IN AN AIR GAP ENVIRONMENT," now U.S. Pat. No. 9,306,906 and is further related to, and claims priority to U.S. Provisional Patent Application No. 61/804,904 filed Mar. 25, 2013, entitled "SYSTEM AND METHOD FOR CREATING UNI-DIRECTIONAL INTER-HOST CONNECTION IN AN AIR GAP ENVIRONMENT," the entire contents of which are incorporated herein by reference.

TECHNICAL FIELD

Embodiments relate to techniques for communication between security layers in an air gap environment that allow communication between a host in a trusted security layer and an untrusted host on a different security layer. More particularly, embodiments relate to providing a trusted layered management network having a host that communicates with another host with a unidirectional transfer.

BACKGROUND

Within complex computing networks there is a need to provide sufficient security so that sensitive data is maintained in a secure manner. As computing systems and networks become more complex and more layered, this becomes an increasingly difficult task. In some environments, trusted components must communicate with untrusted components. With this communication there is risk that the untrusted component is malicious.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
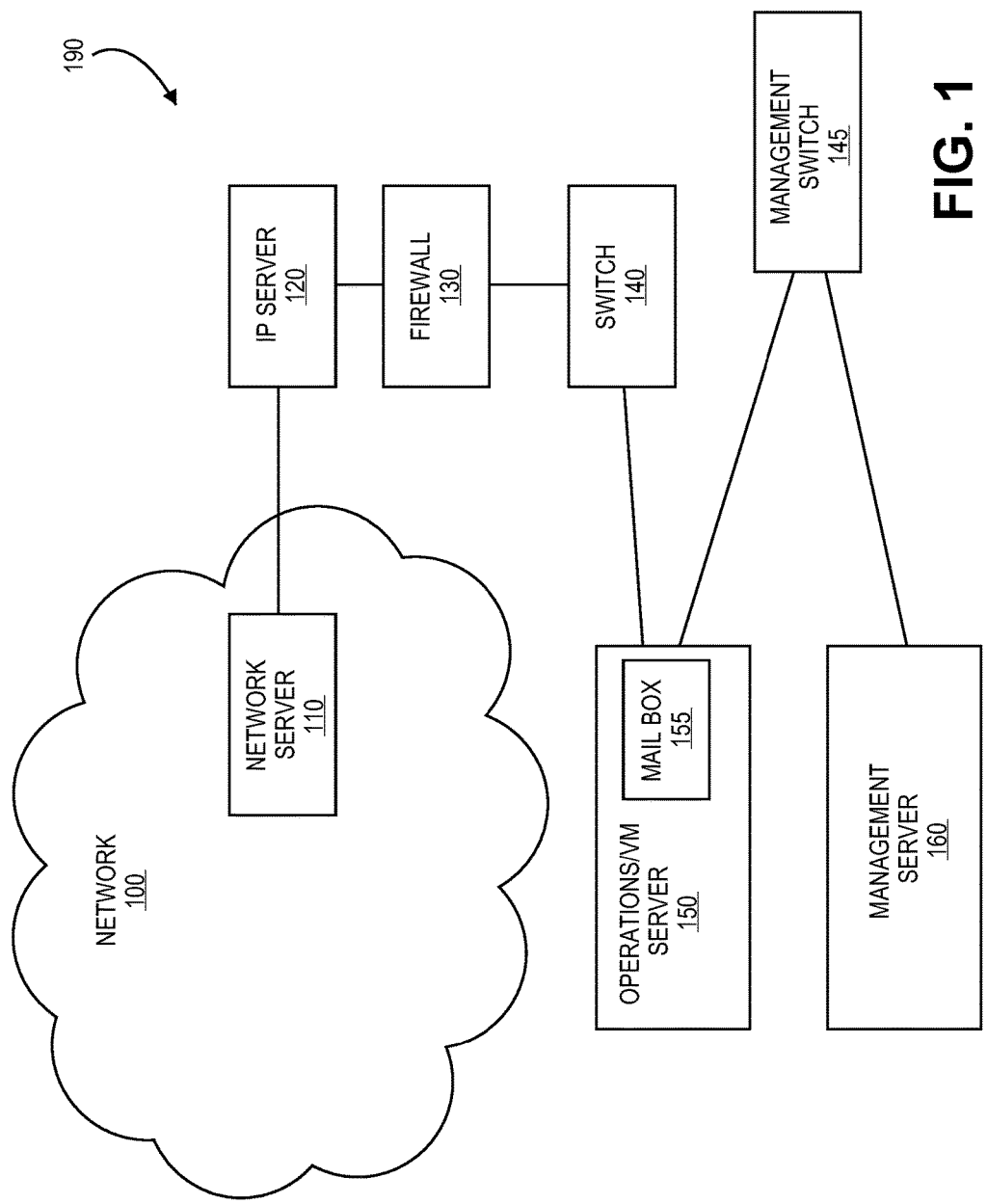
FIG. 1 is a block diagram of a network environment in which the techniques described herein can be utilized for unidirectional inter-host communications in a computing environment.

In the following description, numerous specific details are set forth. However, embodiments of the invention may be practiced without these specific details. In other instances, well-known circuits, structures and techniques have not been shown in detail in order not to obscure the understanding of this description.

The technology disclosed relates to designing rules for security layers for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The technology disclosed relates to providing a method that can create a unidirectional inter-host connection in an air gap environment. In some implementations, the technology disclosed can create a management network that includes a host. The host in the management network can manage resources on other network layers (e.g., compute layer). At a high level, a server on the management layer can, for example, receive a request from an operator for a resource (e.g., a virtual machine) to be created on a compute layer server that can be accessed by a customer network. The management layer server sends a request to a compute layer server to create the requested resource. The host in the customer network can manage traffic in the customer network and receive data packets from the host in the management layer.

In some implementations, the technology disclosed can design rules for security layers like firewalls and proxies to enable unidirectional traffic from the management layer to the compute layer. The management layer can manage and establish connections with the hosts in the compute layer. In one embodiment, communication between servers on the compute layer can also be through the mailbox. In one embodiment, a management server reads messages in a mailbox, interprets the messages and sends a message to the target compute layer server.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In one embodiment, untrusted code can run on a first (e.g., computing, compute) layer while trusted code can run on a second (e.g., management, control) layer within a computing environment. In one embodiment, the computing environment is an on demand services computing environment. In one embodiment, the computing environment is a multi-tenant database environment.

In one embodiment, a conceptual "mailbox" is utilized to communicate between layers. In one embodiment, entities in the management layer can send messages to entities in other layers via this conceptual mailbox. If there is a response to a message, the compute layer entity can place a response in the mailbox and the management entity can check the mailbox for a response. Thus, all communication is under the control of the trusted entity on the management layer. In one embodiment, network firewall rules/policies are utilized to prevent traffic from the compute layer to the management layer.

FIG. 1 is a block diagram of a network environment in which the techniques described herein can be utilized for unidirectional inter-host communications in a computing environment. Network 100 can be any type of network that interconnects multiple computing devices. For example, network 100 can be the Internet, or a corporate wide area network (LAN), or any other interconnection of devices.

Network server 110 operates to provide content to one or more devices via network 100. In one embodiment, network server 110 is coupled with Internet Protocol (IP) server 120 to provide IP traffic. In alternate embodiments, additional and/or different types of traffic can be supported. IP server 120 is coupled with firewall 130, which provides firewall functionality on traffic between IP server 120 and network components behind firewall 130. In one embodiment, firewall 130 provides traffic control between the management layer and the computing layer, as described in greater detail below.

In one embodiment, firewall 130 is coupled with switch 140 and management switch 145. Switch 140 operates to route non-management network traffic from firewall 130 to and from operations/VM server 150. Operations/VM server 150 provides server functionality (e.g., HTTP server, one or more virtual machines) to remote devices. The traffic for this functionality is routed through switch 140. In the example of FIG. 1, only one operations/VM server is illustrated; however, any number of servers can be supported. In one embodiment, operations/VM server 150 is not secure or trusted in that one or more applications can be not secured or not trusted.

Management switch 145 is coupled with firewall 130 and management server 160. Management switch 145 operates to route secure and/or management traffic to and from management server 160. In one embodiment, management switch 145 also routes secure and/or management traffic to and from operations/VM server 150. In one embodiment, firewall 130 controls the flow of secure and/or management traffic through management switch 145. In one embodiment, management server 160 provides a secure environment for operation of trusted applications/entities within computing environment 190. In one embodiment, computing environment 190 is a multi-tenant database environment or other on demand services environment.

In one embodiment, there are at least two virtual local area networks (VLANs) or at least two virtual private networks (VPNs) within computing environment 190. One VLAN/VPN is for traffic to and from firewall 130 and operations/VM server 150 through switch 140. This VLAN/VPN is for untrusted or non-secure traffic. The other VLAN/VPN is for traffic to and from firewall 130 and management server 160 and/or operations/VM server 150 through management switch 145. This VLAN/VPN is for trusted or secure traffic. Thus, a virtual air gap is provided between the two VLANs/VPNs. In one embodiment, firewall 130 controls traffic between the two VLANs/VPNs utilizing the conceptual mailbox discussed above.

In one embodiment, firewall 130 enforces rules to allow network traffic to flow from management server 160 to operations/VM server 150, but not in the reverse direction. This allows trusted/secure traffic to flow to an untrusted/non-secure entity, but prevents untrusted/non-secure traffic to flow to the trusted/secure entity. In one embodiment, operations/VM server 150 maintains management mailbox 155 for processing management traffic.

In one embodiment, management server 160, running secure/trusted code, initiates transmission of a message to operations/VM server 150. The message can be, for example, a management/configuration message. Other types of messages can be sent in a similar manner. In one embodiment, management server 160 transmits a message to operations/VM server 150 by transmitting a message that is routed by management switch 145 to firewall 130 where traffic rules are applied and the message is sent back to management switch 145. The message is then sent to operations/VM server 150 and received in mailbox 155.

Operations/VM server 150 accesses messages from mailbox 155 to perform the functions required by the messages. In one embodiment, if a response is required, operations/VM server 150 places a response message in mailbox 155. Management server 160 can check mailbox 155 for responses (or requests) from operations/VM server 150. In one embodiment, management server 160 can check mailbox 155 by going through management switch 145 to mailbox 155. In an alternate embodiment, management server 160 can check mailbox 155 by going through management switch 145 and firewall 130 to mailbox 155.

Figure 2:
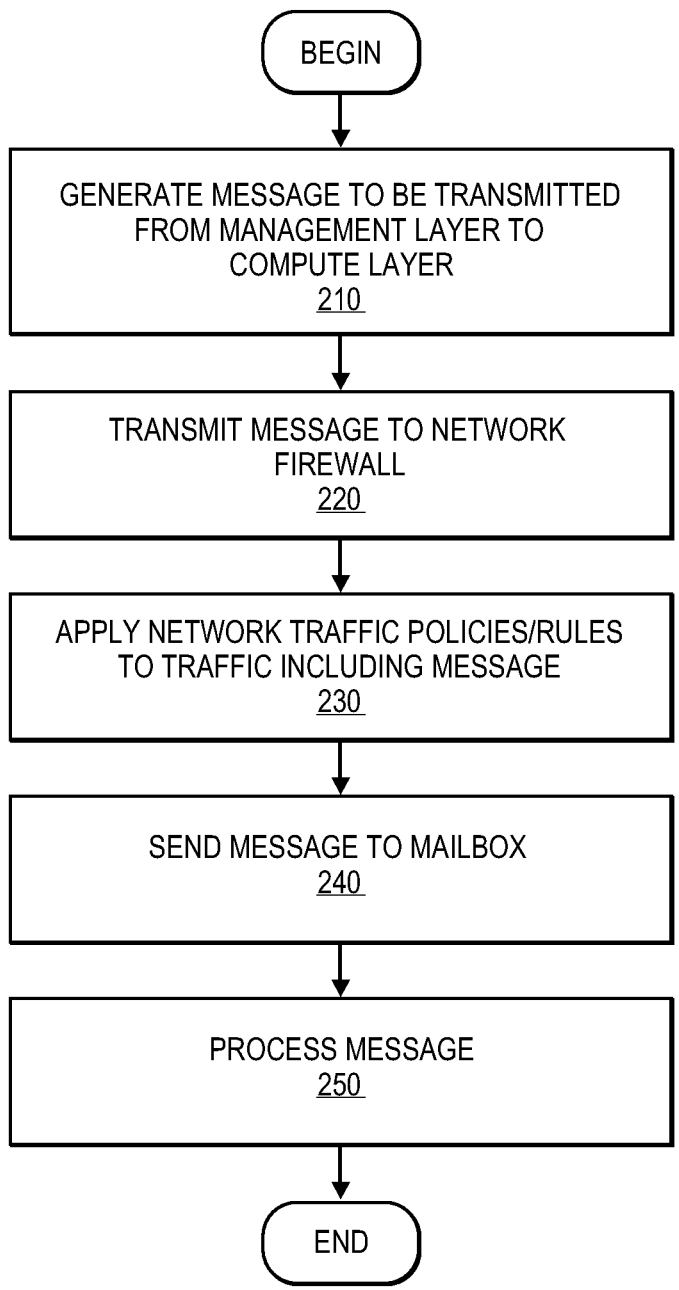
FIG. 2 is a flow diagram of one embodiment of a technique to provide unidirectional inter-host communications from a management layer component to a non-management layer component in a computing environment.

FIG. 2 is a flow diagram of one embodiment of a technique to provide unidirectional inter-host communications from a management layer component to a non-management layer component in a computing environment. As discussed above, a server on a management layer can send messages to a device on a different layer. In one embodiment, the management layer device generates a message to be transmitted to the non-management layer device, 210. In one embodiment, code running on a secure/trusted management server generates a message to be transmitted to the non-management layer component. The message can be, for example, a configuration message, cryptographic information, etc.

The message is transmitted to the network firewall, 220. In one embodiment, the message may pass through one or more management layer components, for example, one or more management switches. The firewall applies network traffic policies/rules to the traffic including the message, 230. In one embodiment, the firewall enforces unidirectional traffic flow from the management layer to non-management layers within the networked environment. Additional and/or different network traffic rules can also be applied by the firewall.

The message is sent to the target non-management layer component and received with a conceptual mailbox, 240. The message may pass through one or more non-management layer component, for example, one or more switches. The mailbox operates to receive management messages and to store the messages until they can be processed, 250, by the receiving component. For example, a non-management layer server can receive configuration information form a management layer component while being prevented from sending non-trusted traffic back to the management layer component.

Figure 3:
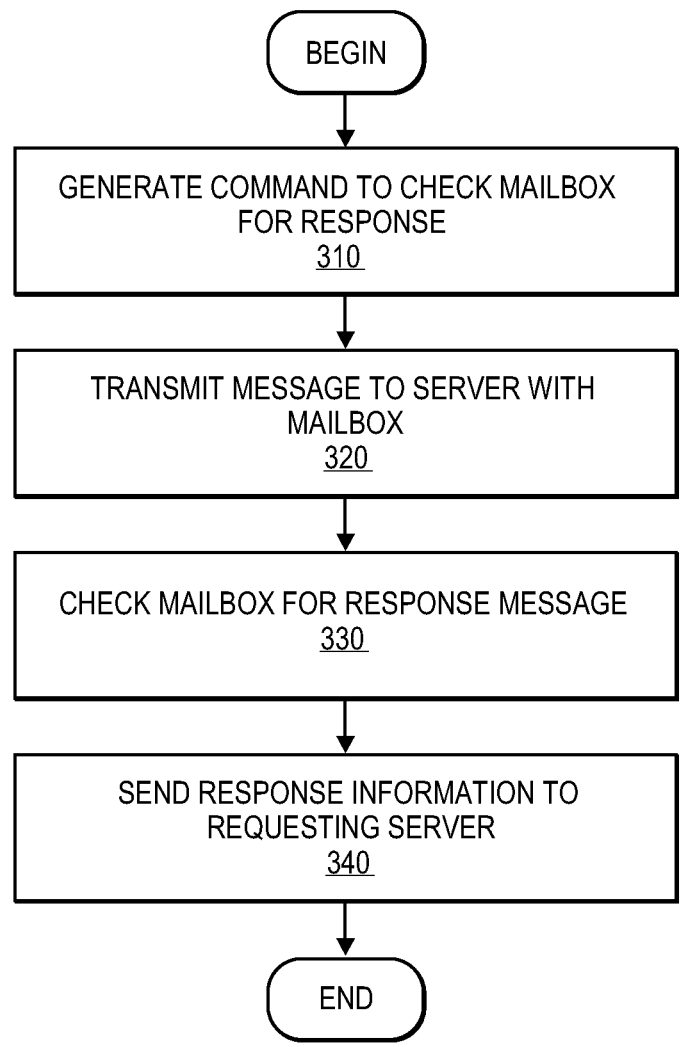
FIG. 3 is a flow diagram of one embodiment of a technique to provide unidirectional inter-host communications from a non-management layer component to a management layer component in a computing environment.

FIG. 3 is a flow diagram of one embodiment of a technique to provide unidirectional inter-host communications from a non-management layer component to a management layer component in a computing environment. As discussed above, a non-management component/entity can provide information to a management component/entity via a virtual mailbox in the non-management layer.

In one embodiment, the management layer component generates a command to check a mailbox in a non-management layer component, 310. In one embodiment, the management layer component runs trusted/secure code that is authorized to check the mailbox. In one embodiment, after sending a message to a non-management layer component (e.g., FIG. 2), the management layer component may follow up with checking the mailbox automatically.

The management layer component transmits the message to the server having the mailbox, 320. In one embodiment, the message passes through one or more network entities (e.g., management switch, firewall, switch) in order to reach the mailbox. The mailbox is checked for a response message, 330. In one embodiment, the server hosting the mailbox receives a message from the management component and checks the mailbox for response information. The response information is transmitted back to the requesting (e.g., management layer) server, 340.

In one embodiment, the trusted component (e.g., management server) initiates the connection and pulls the messages from the non-trusted (e.g., compute server, VM server). The firewall allows this connection to be initialized from trusted component only and allows traffic back to allow the messages to be downloaded by the trusted component via the initialized (established) connection. Thus, all traffic is under the control and direction of the trusted/secure component.

Figure 4:
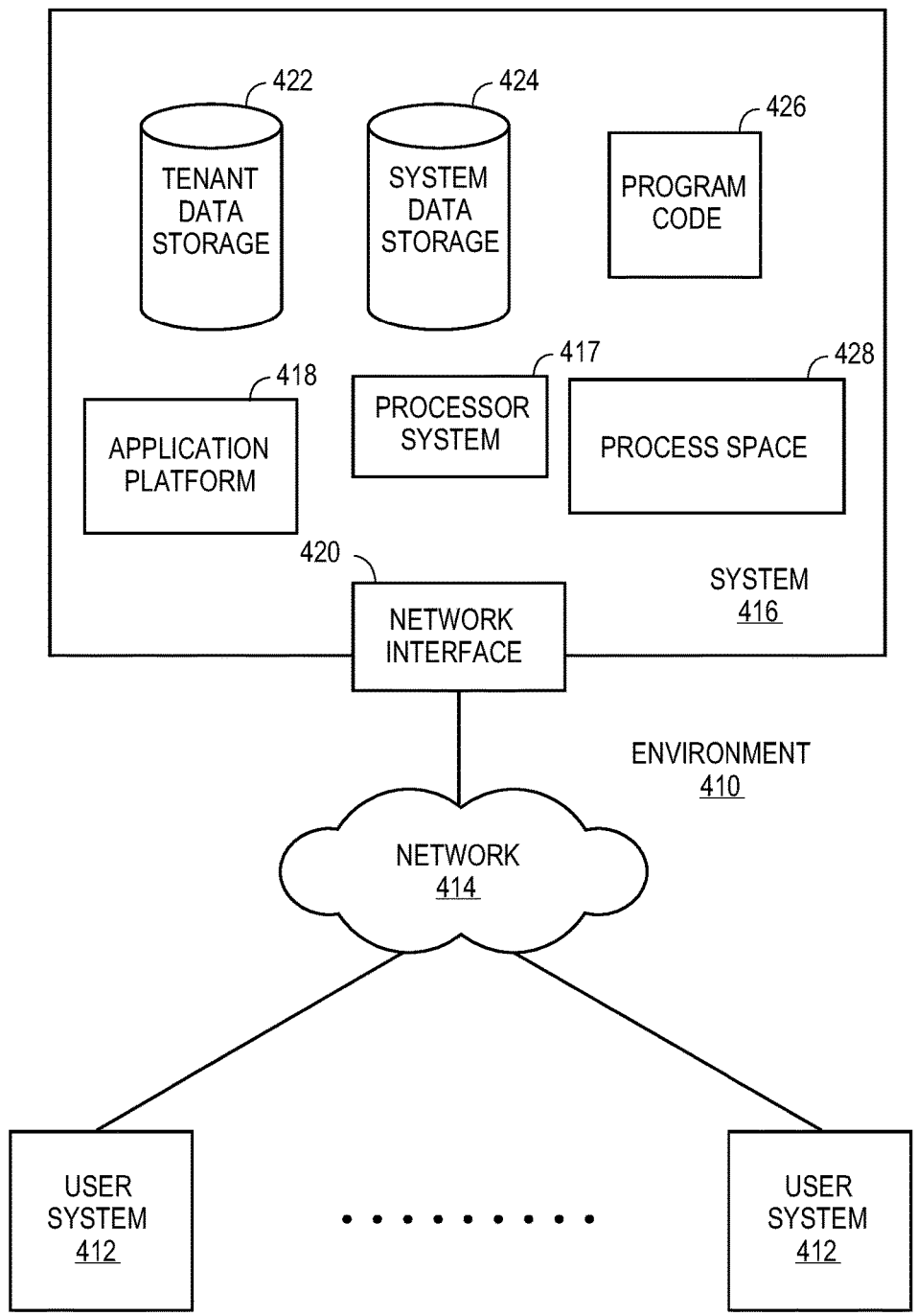
FIG. 4 is a block diagram of one environment wherein an on-demand database service might be used.

FIG. 4 illustrates a block diagram of an environment 410 wherein an on-demand database service might be used. Components within environment 410 may belong to different layers (e.g., compute, management) and may communicate as described above. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein.

A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
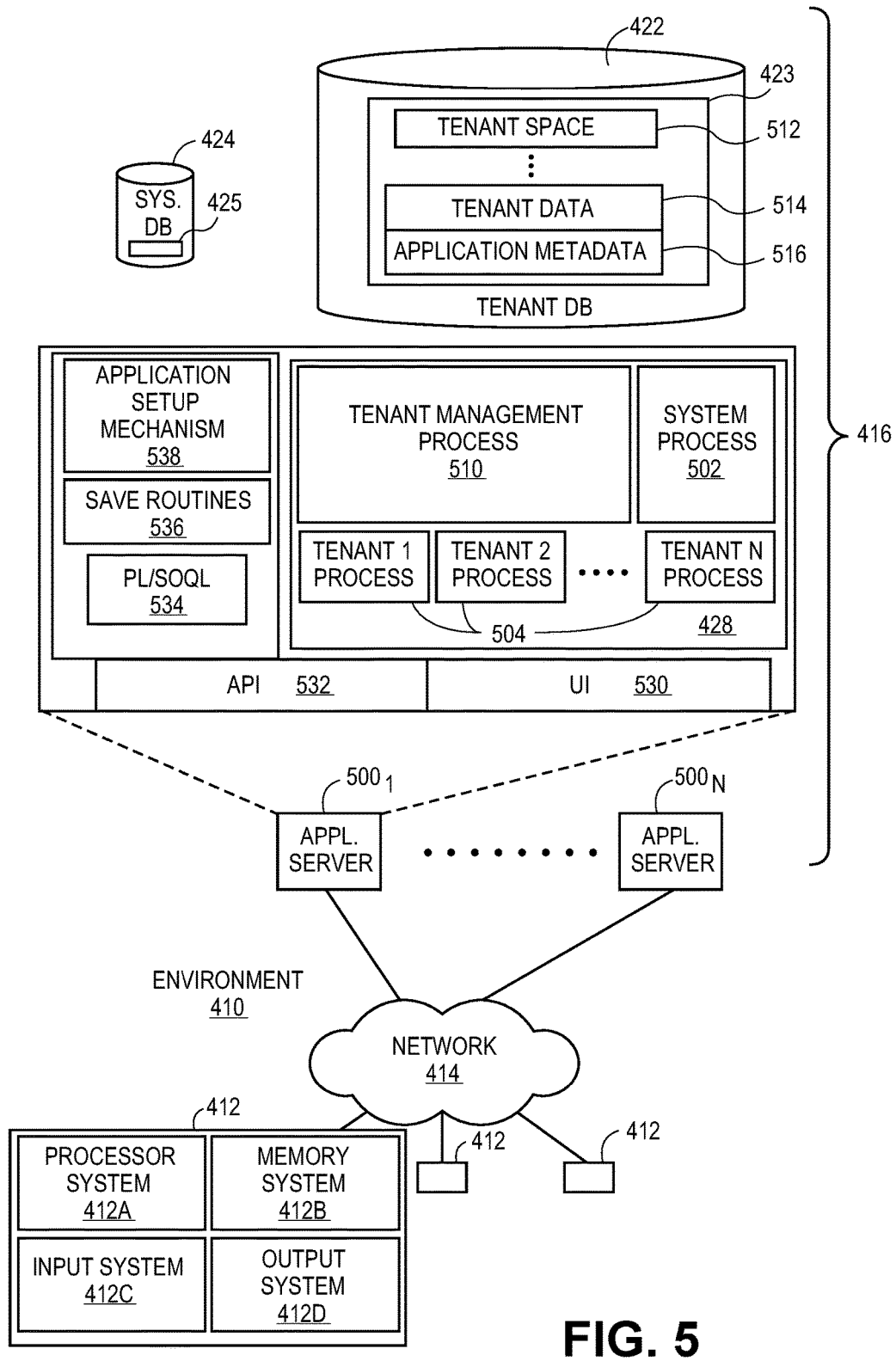
FIG. 5 is a block diagram of one embodiment of elements of environment of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424.

Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data. Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   maintaining a virtual mailbox on a non-trusted network entity executing non-trusted code, on a first network layer, wherein the virtual mailbox is configurable to store messages to be passed between the first network layer and a second network layer, wherein network entities on the second network layer execute only trusted code;
   receiving a request message at the virtual mailbox from a trusted network entity on the second network layer to a non-trusted network entity on the first network layer through a flow of traffic from the second network layer to the first network layer that involves only connections initialized from the first network layer to the second network layer, wherein messages to be downloaded by the trusted network entity are through a connection initialized by a component of the second network layer;
   performing one or more operations in the first network layer in response to the request message;
   generating results in the first network layer in response to the request message;
   storing the results in the virtual mailbox;
   receiving, from authorized trusted code executed on the second network layer, a response check message from the management network entity, the response check message to determine whether the results are available in the virtual mailbox in response to the request message.

2. The method of claim 1 wherein the trusted network entity comprises a management server.

3. The method of claim 2 wherein the non-trusted network entity comprises a compute layer server.

4. The method of claim 1 wherein the trusted network entity is part of a first virtual private network (VPN), the non-trusted network entity is part of a second VPN, and the firewall is configured to communicate with both the first VPN and the second VPN.

5. The method of claim 1 wherein the trusted network entity is part of a first virtual local area network (VLAN), the non-trusted network entity is part of a second VLAN, and the firewall is configured to communicate with both the first VLAN and the second VLAN.

6. The method of claim 1 wherein the trusted network entity is a management server within an on demand services environment and the non-trusted network entity is a content server within the on demand services environment.

7. The method of claim 6 wherein the on demand services environment comprises a multi-tenant database environment.

8. A non-transitory computer-readable medium having stored thereon instructions that, when executed by one or more processors, is configurable to cause the one or more processors to:
   maintain a virtual mailbox on a non-trusted network entity executing non-trusted code, on a first network layer, wherein the virtual mailbox is configurable to store messages to be passed between the first network layer and a second network layer, wherein network entities on the second network layer execute only trusted code;
   receive a request message at the virtual mailbox from a trusted network entity on the second network layer to a non-trusted network entity on the first network layer through a flow of traffic from the second network layer to the first network layer that involves only connections initialized from the first network layer to the second network layer, wherein messages to be downloaded by the trusted network entity are through a connection initialized by a component of the second network layer;
perform one or more operations in the first network layer in response to the request message;
generate results in the first network layer in response to the request message;
store the results in the virtual mailbox;
receive, from authorized trusted code executed on the second network layer, a response check message from the management network entity, the response check message to determine whether the results are available in the virtual mailbox in response to the request message.

9. The non-transitory computer-readable medium of claim 8 wherein the trusted network entity comprises a management server.

10. The non-transitory computer-readable medium of claim 9 wherein the non-trusted network entity comprises a compute layer server.

11. The non-transitory computer-readable medium of claim 8 wherein the trusted network entity is part of a first virtual private network (VPN), the non-trusted network entity is part of a second VPN, and the firewall is configured to communicate with both the first VPN and the second VPN.

12. The non-transitory computer-readable medium of claim 8 wherein the trusted network entity is part of a first virtual local area network (VLAN), the non-trusted network entity is part of a second VLAN, and the firewall is configured to communicate with both the first VLAN and the second VLAN.

13. The non-transitory computer-readable medium of claim 8 wherein the trusted network entity is a management server within an on demand services environment and the non-trusted network entity is a content server within the on demand services environment.

14. The non-transitory computer-readable medium of claim 13 wherein the on demand services environment comprises a multi-tenant database environment.

15. A system comprising:
at least one memory system having hardware memory devices;
one or more hardware processors coupled with the at least one memory system, the one or more processors to execute instructions stored within the system to maintain a virtual mailbox on a non-trusted network entity executing non-trusted code, on a first network layer, wherein the virtual mailbox is configurable to store messages to be passed between the first network layer and a second network layer, wherein network entities on the second network layer execute only trusted code, to receive a request message at the virtual mailbox from a trusted network entity on the second network layer to a non-trusted network entity on the first network layer through a flow of traffic from the second network layer to the first network layer that involves only connections initialized from the first network layer to the second network layer, wherein messages to be downloaded by the trusted network entity are through a connection initialized by a component of the second network layer, to perform one or more operations in the first network layer in response to the request message, to generate results in the first network layer in response to the request message, to store the results in the virtual mailbox, to receive, from authorized trusted code executed on the second network layer, a response check message from the management network entity, the response check message to determine whether the results are available in the virtual mailbox in response to the request message.

16. The system of claim 15 wherein the trusted network entity comprises a management server.

17. The system of claim 16 wherein the non-trusted network entity comprises a compute layer server.

18. The system of claim 15 wherein the trusted network entity is part of a first virtual private network (VPN), the non-trusted network entity is part of a second VPN, and the firewall is configured to communicate with both the first VPN and the second VPN.

19. The system of claim 15 wherein the trusted network entity is part of a first virtual local area network (VLAN), the non-trusted network entity is part of a second VLAN, and the firewall is configured to communicate with both the first VLAN and the second VLAN.

20. The system of claim 15 wherein the trusted network entity is a management server within an on demand services environment and the non-trusted network entity is a content server within the on demand services environment.

21. The system of claim 20 wherein the on demand services environment comprises a multi-tenant database environment.

* * * * *